US012645133B2

(12) United States Patent
Dasilva et al.

(10) Patent No.: US 12,645,133 B2
(45) Date of Patent: Jun. 2, 2026

(54) LENS-BASED REMOVABLE FILTER HOLDER

(71) Applicant: Sphere Entertainment Group, LLC, New York, NY (US)

(72) Inventors: Deanan Dasilva, Malibu, CA (US); Michael Graae, Brooklyn, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 911 days.

(21) Appl. No.: 17/887,256

(22) Filed: Aug. 12, 2022

(65) Prior Publication Data

US 2024/0053661 A1     Feb. 15, 2024

(51) Int. Cl.
*G03B 17/14*          (2021.01)

(52) U.S. Cl.
CPC ................................... *G03B 17/14* (2013.01)

(58) Field of Classification Search
CPC ...................................................... G03B 17/14
USPC ........................................................ 359/544
See application file for complete search history.

(56) References Cited

U.S. PATENT DOCUMENTS

| | | | |
|---|---|---|---|
| 5,751,500 A | 5/1998 | Bedzyk | |
| 7,405,760 B2 | 7/2008 | Cho et al. | |
| 10,154,716 B2 * | 12/2018 | Chan | A45C 13/02 |
| 10,901,306 B2 | 1/2021 | Yamazaki | |
| 2011/0189808 A1 | 8/2011 | Watanabe | |
| 2012/0113276 A1 | 5/2012 | Van Arendonk et al. | |
| 2013/0222685 A1 | 8/2013 | Topliss et al. | |

| | | | |
|---|---|---|---|
| 2017/0104022 A1 * | 4/2017 | Okamura | H10F 39/811 |
| 2017/0123298 A1 * | 5/2017 | Hine | G02B 7/14 |
| 2017/0146766 A1 | 5/2017 | Hsu et al. | |
| 2017/0214830 A1 | 7/2017 | Tang et al. | |
| 2017/0310862 A1 * | 10/2017 | O'Neill | G03B 17/566 |
| 2018/0084647 A1 | 3/2018 | Nalla et al. | |
| 2018/0114804 A1 | 4/2018 | Hsieh | |

(Continued)

FOREIGN PATENT DOCUMENTS

| | | |
|---|---|---|
| CN | 110873994 A | 3/2020 |
| CN | 116261023 A | 6/2023 |

(Continued)

OTHER PUBLICATIONS

Rockwell Ken: "Nikon 300mm f/4 AF Review", Jun. 1, 2018; 7 pages.

(Continued)

*Primary Examiner* — Sharrief I Broome
(74) *Attorney, Agent, or Firm* — Sterne, Kessler, Goldstein & Fox P.L.L.C.

(57)          ABSTRACT

Disclosed herein are apparatus and system aspects for a removable filter holder. An aspect includes a camera lens body, camera lenses positioned within the camera lens body, slots along the camera lens body among the camera lenses, guide mechanisms positioned in the slots, and removable filter holders positioned in the slots along the guide mechanisms. The removable filter holders of this aspect include an upper flange that partially contacts the camera lens body via a bottom surface, a perimeter gasket coupled to the bottom surface of the upper flange, and a shaft coupled to the bottom surface of the upper flange. The shaft of this aspect includes a removable filter, a filter setting configured to hold the removable filter, and an arm that connects the upper flange to the filter setting.

19 Claims, 5 Drawing Sheets

(56) References Cited

U.S. PATENT DOCUMENTS

| | | |
|---|---|---|
| 2019/0174087 A1 | 6/2019 | Kim et al. |
| 2020/0073214 A1* | 3/2020 | Yamazaki ............ G03B 17/565 |
| 2020/0336633 A1* | 10/2020 | Sesti ...................... G02B 7/003 |
| 2021/0074750 A1 | 3/2021 | Gu et al. |
| 2022/0006929 A1 | 1/2022 | Li et al. |
| 2024/0064394 A1 | 2/2024 | Shin et al. |
| 2024/0107141 A1 | 3/2024 | Jo et al. |

FOREIGN PATENT DOCUMENTS

| | | |
|---|---|---|
| EP | 3693790 B1 | 10/2022 |
| JP | 2000180689 A | 6/2000 |
| JP | 5573164 B2 | 8/2014 |
| WO | WO 2022/145954 A1 | 7/2022 |

OTHER PUBLICATIONS

International Search Report and Written Opinion directed to related International Application No. PCT/US2023/074935, mailed Apr. 25, 2024; 9 pages.
International Search Report and Written Opinion directed to related International Application No. PCT/US2023/074912, mailed Apr. 24, 2024; 11 pages.

* cited by examiner

100

106

102

104

114

110

108

118

112

116

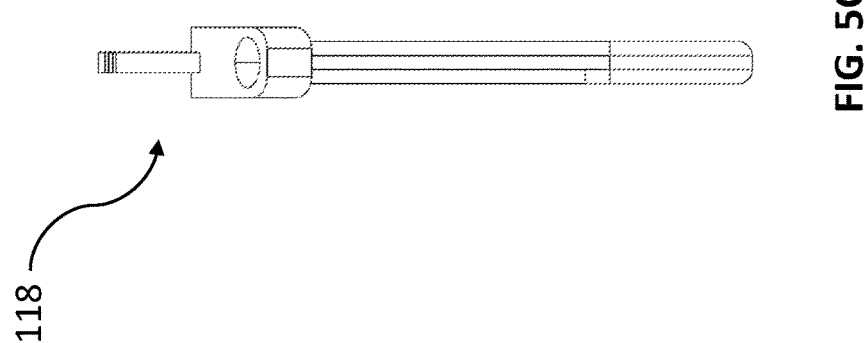
118
FIG. 5C
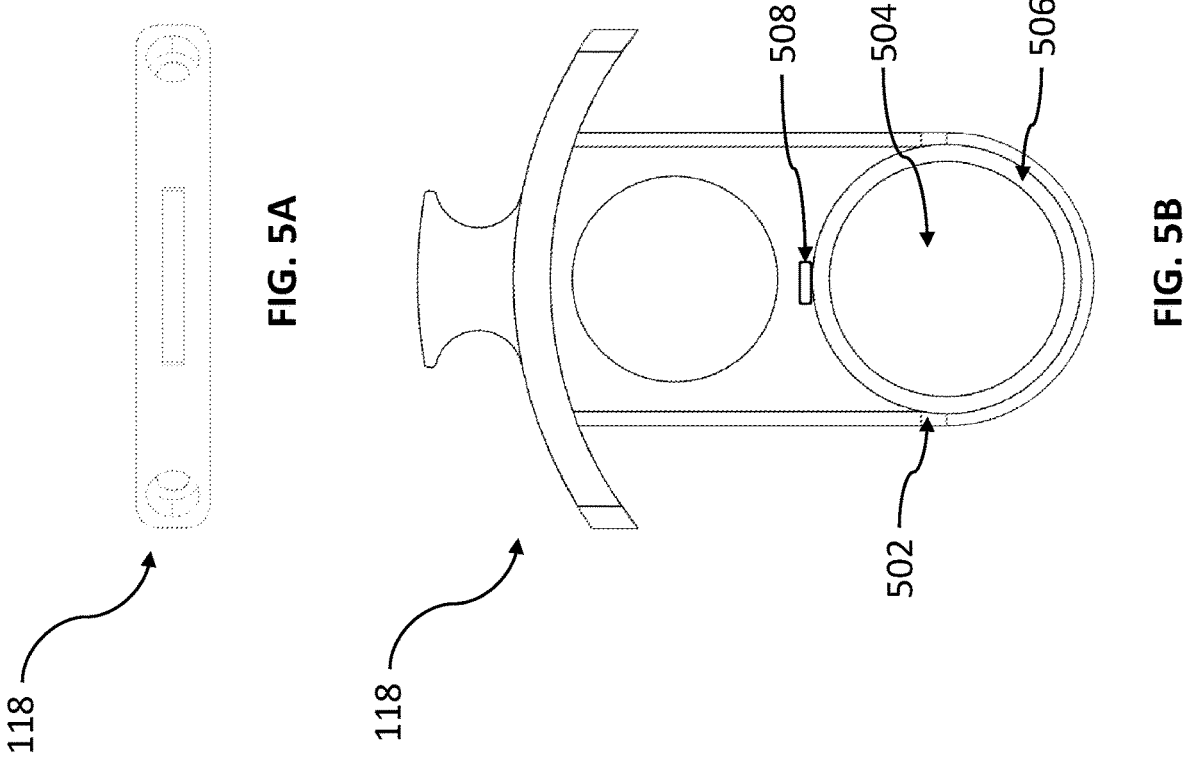
118
FIG. 5A
118
508
504
506
502
FIG. 5B

LENS-BASED REMOVABLE FILTER HOLDER

BACKGROUND

Technical Field

Aspects of the present disclosure relate to components and systems for removable filter holders positioned in camera lenses for cameras with large image sensors.

Background

A camera is a device used to capture and record real-life images in the form of photographs and/or videos. In order to capture and record such images, cameras may consist of a camera body and a camera lens. A camera lens may focus light reflected from objects in the real world onto an image sensor in the camera body. An image sensor is an electronic device that converts the focused light into an electronic signal representing a digital image. The image may then be used to generate a photograph or a frame in a high quality video stream. The camera body may also include controls, circuitry, and processors to execute computer-readable instructions that control various operations of the camera and a memory storage to save the digital images. Some cameras may receive power from an external power source (e.g., via a wire connection to a power outlet) while other cameras may receive power from an internal power source (e.g., a built-in or attachable battery pack).

A camera lens may be a single lens element or an assembly of lenses, where an assembly of lenses may contain one or more lens groups. A camera lens generally consists of convex and/or concave optical components used to bend incoming light in specific ways, such as towards a single focal point. In an assembly of lenses, the cumulative effect of various lens elements or lens groups allow the light to bend in specific ways. The type of camera lens used may determine camera characteristics like aperture range, depth of field, or focusing distance. Other camera components may include a filter or a focusing mechanism.

A camera filter may be made of glass or another material, such as gelatin, and can serve various purposes, such as minimizing glare, enhancing certain colors, or reducing light intake. One such type of filter is a low pass filter. A low pass filter is a birefringent crystal containing several layers of variously shaded components used to eliminate moiré (e.g., an interference pattern) through a process such as splitting incoming light in order to blur image details. Some filters, such as low pass filters, are attached behind the camera lens and in front of the image sensor, and are designed according to the specifications of a particular camera body (i.e., rather than the camera lens or camera lens combination). This filter location and design criteria provides for size-limited, inaccessible, and inflexible camera systems.

SUMMARY

In aspects presented herein, cameras, camera lenses, and removable filter holders can provide for a multi-function optical window capable of applying various camera filters to cameras with large image sensors in an accessible and efficient manner.

In an aspect, an example apparatus for a removable filter holder is described. The example apparatus includes a camera lens body, an upper flange that partially contacts the camera lens body via a bottom surface, a perimeter gasket coupled to the bottom surface of the upper flange, and a shaft coupled to the bottom surface of the upper flange and configured to extend along a guide mechanism into a slot in the camera lens body. The shaft of this example apparatus includes a removable filter, a filter setting configured to hold the removable filter, and an arm that connects the upper flange to the filter setting.

In another aspect, an example system for a camera with a removable filter holder is described. The example system includes a camera lens body, one or more camera lenses positioned within the camera lens body, one or more slots along the camera lens body among the one or more camera lenses, one or more guide mechanisms positioned in the one or more slots, and one or more removable filter holders positioned in the one or more slots along the one or more guide mechanisms. The one or more removable filter holders of this example system include an upper flange that partially contacts the camera lens body via a bottom surface, a perimeter gasket coupled to the bottom surface of the upper flange, and a shaft coupled to the bottom surface of the upper flange. The shaft of this example system includes a removable filter, a filter setting configured to hold the removable filter, and an arm that connects the upper flange to the filter setting.

In yet another aspect, an example apparatus for a removable filter holder is described. The example apparatus includes a shaft extending into a slot in a camera lens body, a filter setting coupled to an end of the shaft, and a removable filter that lies within the filter setting.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIGS. 5A-5C are illustrations of a removable filter holder, according to some aspects of the present disclosure.

In the drawings, like reference numbers generally indicate identical or similar elements. Additionally, generally, the left-most digit(s) of a reference number identifies the drawing in which the reference number first appears.

Figure 1:
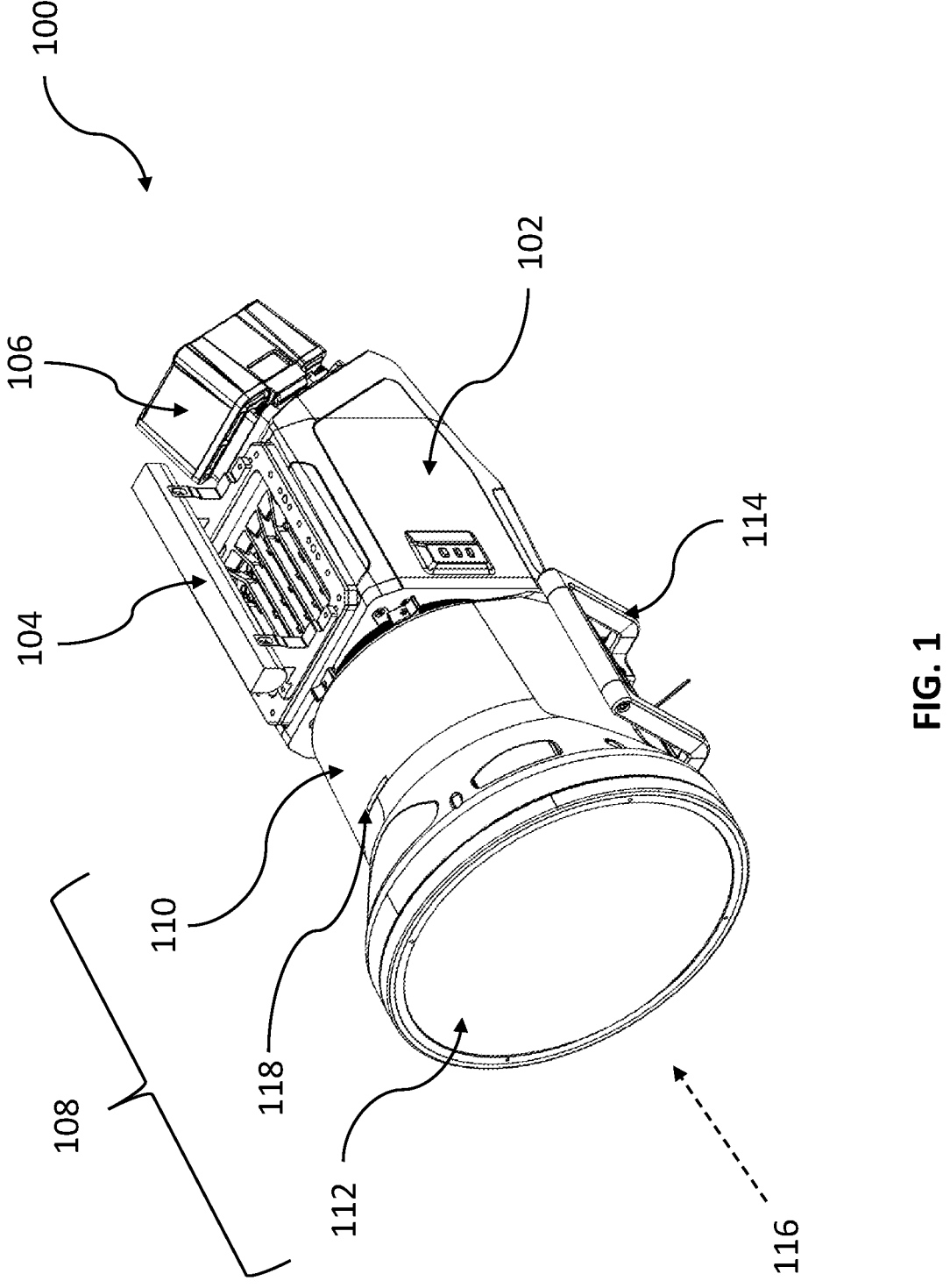
FIG. 1 is an illustration of an example camera system, according to some aspects of the present disclosure.

Aspects of the present disclosure will be described with reference to the accompanying drawings.

DETAILED DESCRIPTION

Provided herein are apparatus, device, and/or system aspects, and/or combinations and sub-combinations thereof for a removable filter holder that can provide for a multi-function optical window capable of applying various camera filters to cameras with large image sensors.

A camera filter may be made of glass or another material, such as gelatin, and can help alter light rays in various ways. For example, a low pass filter can be used to eliminate moiré (e.g., an interference pattern). Camera filters, such as low pass filters made of birefringent crystal, are typically attached behind the camera lens and immediately in front of the image sensor. In these configurations, the thickness of the low pass filter has a significant effect on the resulting image due to principles of the chief ray angle. For example, if a light rays enters the center of the camera lens and passes through a low pass filter having a thickness of 3 millimeters, then the light ray travels a distance of only 3 millimeters. However, a light ray may also enter from the edges of the camera lens. At the most extreme edge, the light approaches from the chief ray angle. A light ray along the chief ray angle that passes through the low pass filter having a thickness of 3 millimeters will actually travel a distance greater than 3 millimeters (e.g., 4 millimeters). This additional travel distance effects how the low pass filter works, and disperses the exiting light, producing color fringing (i.e., chromatic aberration). In traditional configurations where the low pass filters are attached behind the camera lens and in front of the image sensor, one must typically accept a certain amount of color fringing in the resulting image. This is especially true with large image sensors (i.e., large cameras). Additionally in the traditional configurations, the low pass filter must be about as large as the image sensor in order to filter all incoming light before it reaches the image sensor. This means that such low pass filters are typically designed according to the specifications of a particular camera body (i.e., rather than the camera lens). Effectively, as the size of the image sensor (e.g., camera body) increases, it becomes more challenging to implement low pass filters with the traditional configurations.

There are four technological problems associated with implementing certain camera filters, such as low pass filters, in cameras with large image sensors. First, the positioning of a low pass filter behind the camera lens and in front of the image sensor make the resulting image particularly susceptible to negative color fringing effects for light rays entering at the chief ray angle. Second, low pass filters made of birefringent crystals cannot be made with an acceptable defect specification for large image sensors, and thus cannot be implemented under current design into large cameras. Third, even if a camera filter can be made to function with a large image sensor, the camera filter is designed for that particular camera body (i.e., image sensor) and has limited alternative use. Fourth, because a camera filter is designed for that particular camera body and is typically located within that camera body, removing the camera filter for maintenance or replacement can be a cumbersome process requiring disassembly of the camera body.

Aspects herein solve these technological problems using an innovative lens-based removable filter holder that is located within the camera lens and is designed according to the specifications of the camera lens and/or camera body. For example, instead of a low pass filter being located behind the camera lens and in front of the image sensor, the low pass filter will now be located in a multi-function optical window within the camera lens. This innovative approach relocates the filter location from the camera body or camera mount to inside the camera lens among one or more various optical components.

Aspects herein provide various benefits. For example, positioning the low pass filter within the camera lens (i.e., closer to the incoming light rays) lessens the presence of color fringing. In other words, even light rays entering at the edges of the camera lens will travel through the low pass filter at less of an angle, where the thickness of the low pass filter has less of an effect. In another example, there is no longer a need for the camera filter, such as a low pass filter made of birefringent crystal, to be as large as the image sensor. In yet another example, the camera filter is now removable from the camera lens. In other words, a filter can be easily removed in order to make adjustments, a filter in a camera lens can be removed and can be replaced with a different filter for the same camera lens, or a filter can be removed from one lens and inserted into another lens used with the same camera body. Therefore, the innovative approach of a lens-based removable filter holder that is located within the camera lens and is designed according to the specifications of the camera lens and/or camera body solves the above technological problem by easily implementing various camera filters with cameras having large image sensors.

FIG. 1 is an illustration of an example camera system 100, according to some aspects of the present disclosure. Camera system 100 may include a camera body 102, a handle 104, a power source 106, a camera lens 108, and various other camera system components, such as a mounting plate 114. Camera lens 108 may include a camera lens housing 110, one or more camera lenses 112, and various other camera lens components, such as a removable filter holder 118 configured to hold camera filters for altering light 116 in various ways (described below with reference to FIGS. 2-5C).

Camera body 102 may include an image sensor used to convert light 116 into an electronic signal representing a digital image, after light 116 is reflected from objects in the real world through the one or more camera lenses 112 and camera filters. Camera body 102 of camera system 100 may be large, having an image sensor greater than 70 mm on either or both edges.

Camera body 102 may include a handle 104 that allows a user to support, carry, or otherwise physically manipulate camera system 100. In some aspects, power source 106 may be removably coupled to camera body 102 and configured to provide sufficient voltage to power operations of camera body 102. For example, power source 106 may be a removable battery pack providing a DC voltage to camera body 102. In another example, power source 106 may be a power outlet providing an AC voltage via a plug and wire connectable to camera body 102. In other aspects, power source 106 may be incorporated into camera body 102 and not removable by a user. For example, power source 106 may be a single use battery or a rechargeable battery positioned within camera body 102. Camera lens housing 110 may provide mechanical and/or protective support to components internal to camera lens 108, such as one or more camera lenses 112.

Figures 2A, 2B:
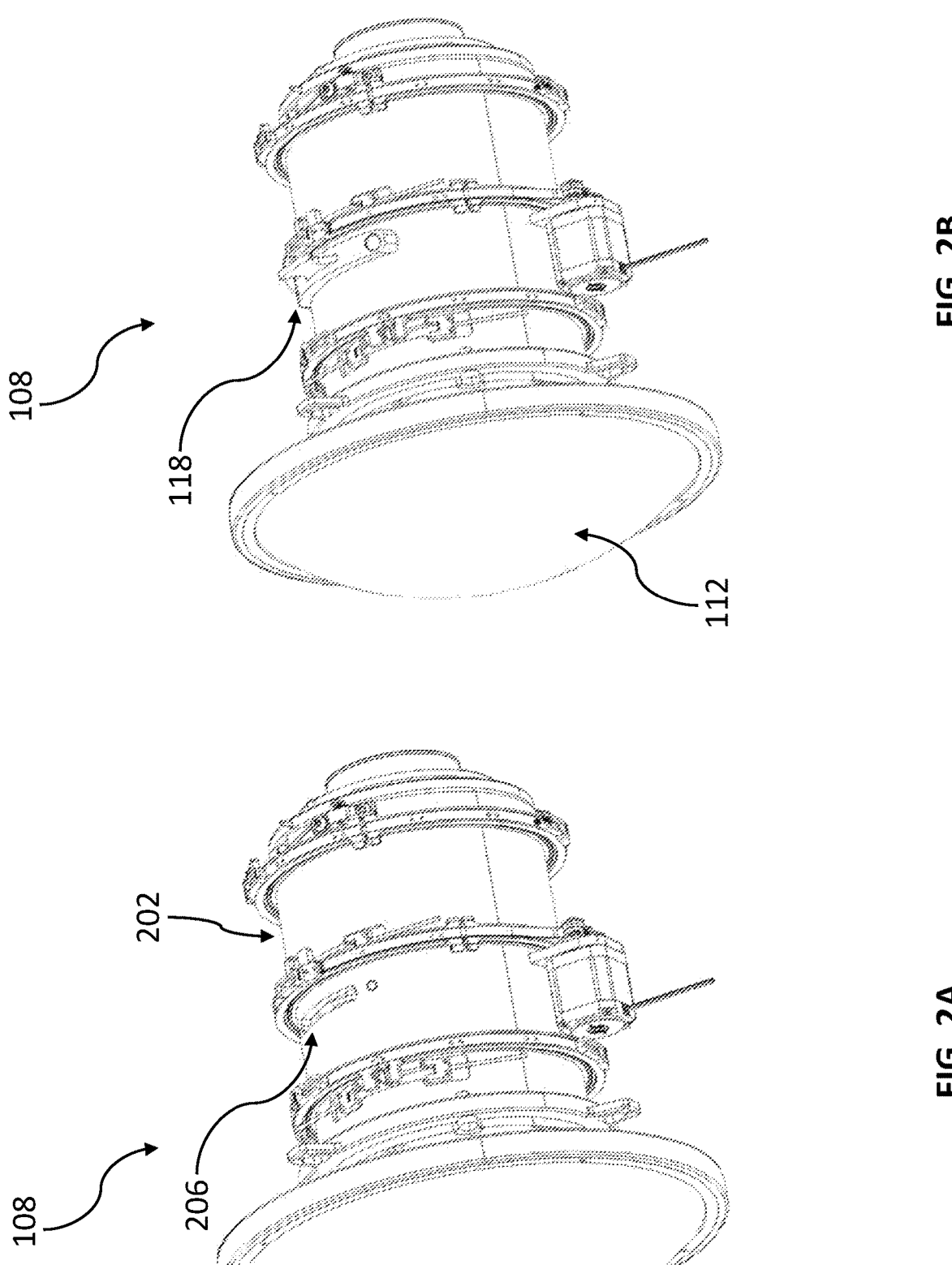
FIGS. 2A-2B are illustrations of a camera lens without a lens housing, according to some aspects of the present disclosure.

FIGS. 2A-2B are illustrations of camera lens 108 without camera lens housing 110, according to some aspects of the present disclosure. When an outermost covering (e.g., camera lens housing 110) is removed from camera lens 108 of camera system 100, certain internal mechanisms can be viewed, as shown in FIGS. 2A-2B. FIG. 2A is an illustration of camera lens 108 without removable filter holder 118 in place and FIG. 2B is an illustration of camera lens 108 with removable filter holder 118 in place.

FIG. 2A also illustrates a camera lens body 202, camera lenses 112, and one or more slots 206. Camera lens body 202 may be a component of camera lens 108. Camera lens body 202 may be a cylinder, a rectangular prism, or any other three-dimensional geometric shape as would be appreciated by a person of ordinary skill in the art. Camera lens body 202 may be elongated along an axis, where the axis is formed by central points of cross-sectional planes of the geometric shape (e.g., axis is formed by central points of cross-sectional circles of the cylinder). Camera lens body 202 may be made of a metal, a metal alloy, a plastic, or any other material as would be appreciated by a person of ordinary skill in the art. Camera lens body 202 may provide structural support to components internal to camera lens 108. Camera lens body 202 may also provide protection to components internal to camera lens 108, including protection from dusts or debris. One such component internal to camera lens 108 that can be supported or protected by camera lens body 202 are camera lenses 112.

Camera lenses 112 may be a single lens element or one or more lens groups in an assembly of lenses. For example, as light rays pass through a convex element, they bend (i.e., refract) inward towards a central (i.e., focal) point. A concave element may be combined with a convex element to assist in refraction towards the central point (i.e., to overcome aberration). This convex and concave element combination may be considered a lens group. And various lens groups may be combined into a camera assembly, where each lens group accomplishes various desired effects (e.g., focusing, color correction, etc.). One or more single lens elements or one or more lens groups may be positioned before (e.g., between an image sensor and slot 206) removable filter holder 118 and one or more single lens elements or one or more lens groups may be positioned after (e.g., between the light-receiving surface of camera lens 108 and slot 206) removable filter holder 118.

Figure 3:
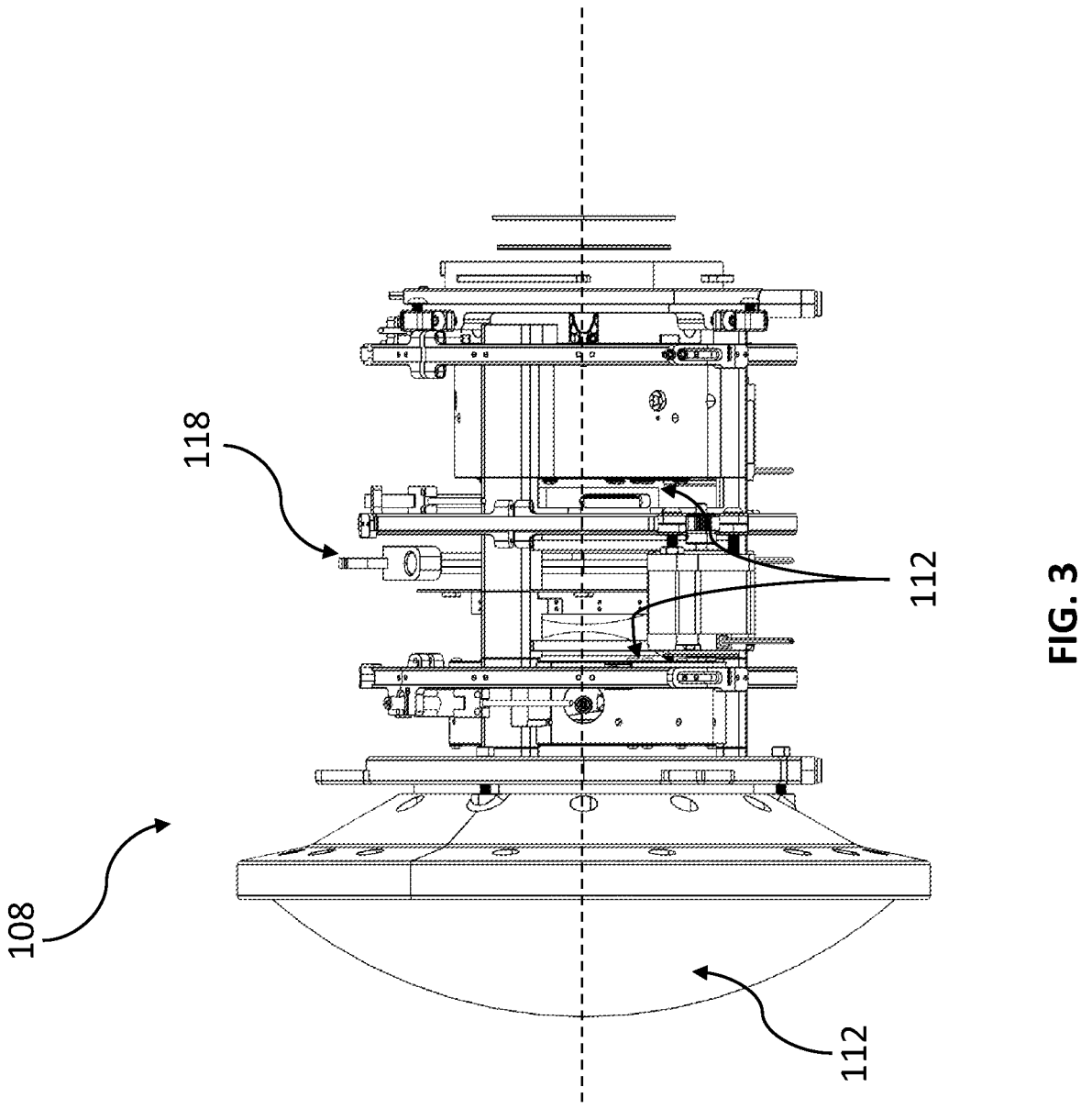
FIG. 3 is an illustration of a camera lens without a lens housing or lens body, according to some aspects of the present disclosure.

Slots 206 may be one or more openings in camera lens body 202, visible from the exterior of camera system 100 when removable filter holders 118 is not in place. Removable filter holders 118 are inserted into slots 206. Slots 206 may be of dimensions allowing shaft 406 to be inserted (described below with reference to FIG. 4). Slots 206 may create one or more openings among camera lenses 112 (i.e., before and/or after). As illustrated by FIGS. 2-3, slots 206 may be positioned perpendicular to the axis, as to be parallel to the cross-sectional planes of the geometric shape. For example, slots 206 may be parallel to the circular cross-section of a cylindrical camera lens body 202. Within the one or more openings of slots 206 may be one or more guide mechanisms used to align removable filter holder 118 within slot 206 and parallel to the cross-sectional planes of the geometric shape. The guide mechanisms may be made of a metal, a metal alloy, a plastic, or any other material as would be appreciated by a person of ordinary skill in the art. The guide mechanisms may include a track and roller system. For example, the guide mechanisms may include two guide tracks on either side of slots 206 and two end caps at the base of the two guide tracks. In this example, the guide mechanisms may also require that removable filter holder 118 have two rollers that follow the two guide tracks into slot 206, stopping at the two end caps at the base of the two guide tracks.

FIG. 3 is an illustration of camera lens 108 without camera lens housing 110 (e.g., outermost covering) or camera lens body 202, according to some aspects of the present disclosure. As illustrated by FIG. 3, camera lenses 112 may be positioned within camera lens body 202 and along the axis. Camera lenses 112 may be positioned perpendicular to the axis, as to be parallel to the cross-sectional planes of the geometric shape. For example, camera lenses 112 may be parallel to the circular cross-sections of a cylindrical camera lens body 202. Camera lenses 112 may be positioned before (e.g., between an image sensor and slot 206) and/or after (e.g., between the light-receiving surface of camera lens 108 and slot 206) slots 206.

Figure 4:
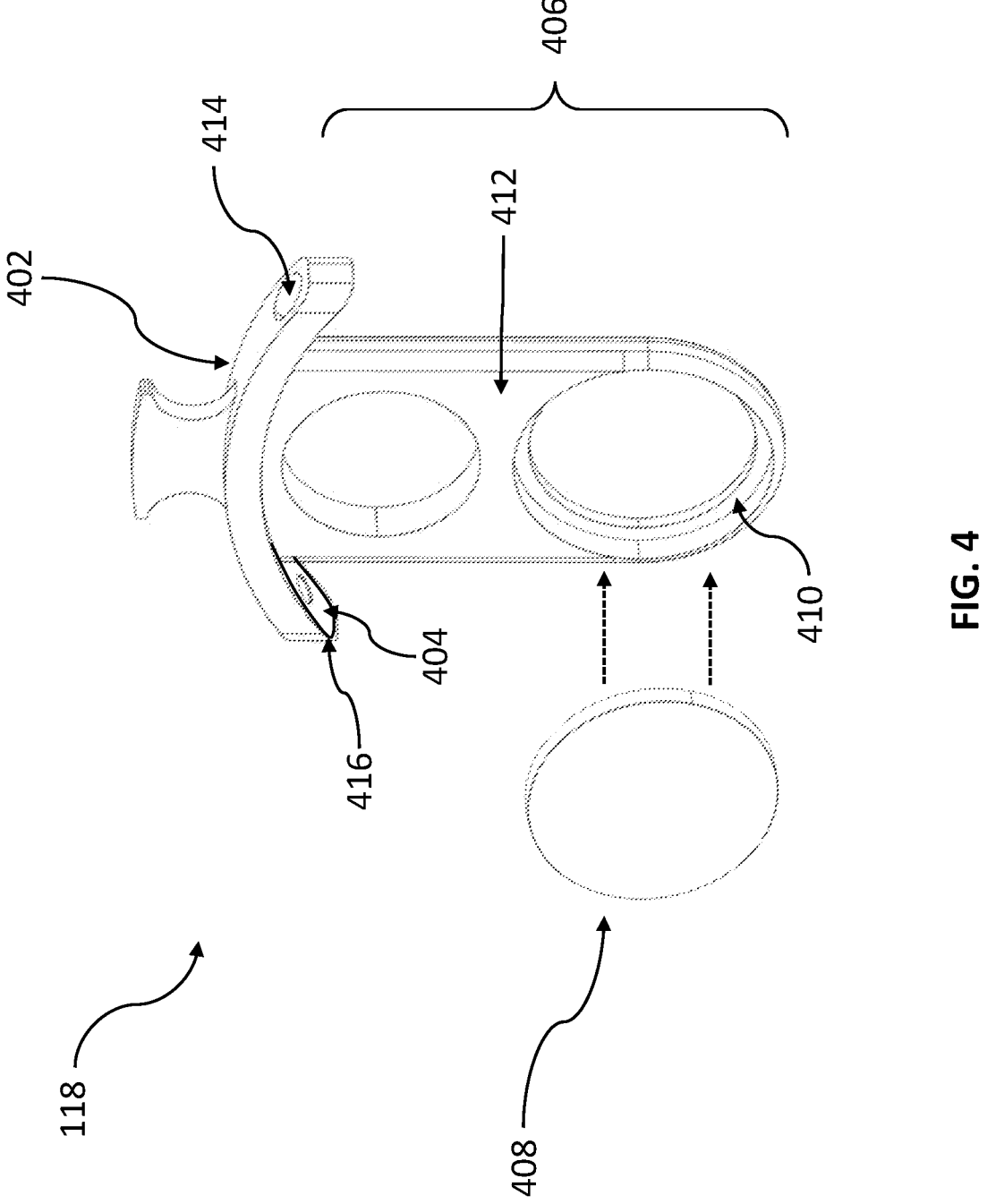
FIG. 4 is an illustration of a removable filter holder, according to some aspects of the present disclosure.

FIG. 4 is an illustration of removable filter holder 118, according to some aspects of the present disclosure. Removable filter holder 118 may be inserted into slots 206 along one or more guide mechanisms. Removable filter holder 118 may include an upper flange 402, a bottom surface 404, and a shaft 406. Shaft 406 may further include a removable filter 408, a filter setting 410, and an arm 412. Removable filter holder 118 may also include one or more fastening mechanisms 414 and/or a perimeter gasket 416.

FIGS. 5A-5C are also illustrations of removable filter holder 118, according to some aspects of the present disclosure. FIG. 5A is a top view of removable filter holder 118. FIG. 5B is a front view of removable filter holder 118 and illustrates details of filter setting 410. FIG. 5C is a side view of removable filter holder 118.

Upper flange 402 may be made of a metal, a metal alloy, a plastic, or any other material as would be appreciated by a person of ordinary skill in the art. Upper flange 402 may be shaped according to the geometric shape of camera lens body 202. For example, if camera lens body 202 is a cylinder, flange 402 may be form an arc having the same radius as the curved surface of camera lens body 202. Upper flange 402 may be shaped in a form ideal for grasping.

Upper flange 402 has a bottom surface 404. Bottom surface 404 may be a flat surface also shaped according to the geometric shape of camera lens body 202. For example, if camera lens body 202 is a cylinder, flange 402 and bottom surface 404 may both form an arc having the same radius as the curved surface of camera lens body 202. Bottom surface 404 may be larger than the opening of slots 206, as to partially contact camera lens body 202 through an overlap of bottom surface 404 on edges of slots 206. Bottom surface 404 may include perimeter gasket 416 coupled to the perimeter of bottom surface 404. Bottom surface 404 may contain a recess slot along its perimeter, where perimeter gasket 416 is coupled to bottom surface 404 inside the recess slot. When bottom surface 404 is larger than the opening of slots 206 and includes perimeter gasket 416, the internal opening of slots 206 is sealed from any external conditions, such as dust or debris. Perimeter gasket 416 may be a made of a rubber, a silicone, a plastic, or any other material as would be appreciated by a person of ordinary skill in the art. Perimeter gasket 416 may be capable of reversibly compressing into any empty space between bottom surface 404 and slots 206.

Upper flange 402 may include fastening mechanisms 414. Fastening mechanism 414 may be used to secure upper flange 402, and thus removable filter holder 118, to camera lens body 202. Fastening mechanism 414 may include one or more threaded screws and threaded holes, or any other fastening mechanism as would be appreciated by a person of ordinary skill in the art. For example, fastening mechanism 414 may include two threaded screws to be fed through two threaded holes on each end of upper flange 402 and into two threaded holes in camera lens body 202.

Shaft 406 may extend from bottom surface 404 of upper flange 402. Shaft 406 is the portion of removable filter holder 118 that extends into the opening of slots 206. Shaft 406 may include a removable filter 408, a filter setting 410, and an arm 412. Removable filter 408 may be a low pass filter, a birefringent crystal, an LC shutter, a diffractive optics filter, a motorized rotating filter, an aperture shape, or any other camera filter as would be appreciated by a person of ordinary skill in the art, or any combination thereof. Removable filter 408 may be of a type configured to be rotatable within filter setting 410. For example, removable filter 408 can have an aperture shape which when rotated can vary the perspective view. In other examples, removable filter 408 can be a polarizing filter, a graduated filter (e.g. from clear to increasing density from one edge to another), or a random light dispersing filter that when rapidly rotated creates a temporally varying special effect or temporally varying anti-aliasing effect. A rotatable removable filter 408 can also be used in a coupled manner to an image processing system where the rotation, and/or an X-axis/Y-axis location is actively moved in a manner that corresponds with the image. Removable filter 408 may be a combination of a rotatable filter and a non-rotatable filter. Removable filter 408 may be a cylinder. For example, removable filter 408 may have a diameter of 58 mm, and a thickness between 3-8 mm. Removable filter 408 may be a rectangular prism or any other three-dimensional geometric shape as would be appreciated by a person of ordinary skill in the art.

Removable filter 408 may be placed in filter setting 410 when both are external to camera system 100. Filter setting 410 may be any means for holding removable filter 408 in the plane of incoming light. More specifically, filter setting 410 may be understood with reference to FIG. 5B. Filter setting 410 may include a table 502 having a central opening 504, a recess slot 506, and at least one fastening mechanism 508. Removable filter 408 may be placed on or inside table 502. Table 502 may be a cylinder, a rectangular prism, or any other three-dimensional geometric shape as would be appreciated by a person of ordinary skill in the art. Central opening 504 allows incoming light to pass through removable filter holder 118 and through removable filter 408. Central opening 504 may be circular. For example, central opening 504 may have a diameter of 51 mm. Central opening 504 may be a rectangle or any other geometric shape as would be appreciated by a person of ordinary skill in the art. Removable filter 408 may be placed inside table 502 via recess slot 506. Recess slot 506 may be a ledge formed through removal of material from an inner perimeter of table 502. The perimeter of removable filter 408 may contact recess slot 506. When removable filter 408 is inserted into recess slot 506, removable filter 408 may lie flush with the surfaces of shaft 406. In other words, the thickness of removable filter 408 may be the same as the amount of material removed from the inner perimeter of table 502 in order to form recess slot 506. Removable filter 408 may be secured on or inside table 502 by fastening mechanism 508. For example, removable filter 408 may be secured inside recess slot 506 by fastening mechanism 508. Fastening mechanism 508 may be a fastener, draw latch, or any other fastening mechanism as would be appreciated by a person of ordinary skill in the art.

Referring back to FIG. 4, arm 412 connects bottom surface 404 to filter setting 410. Arm 412 may be made of a metal, a metal alloy, a plastic, or any other material as would be appreciated by a person of ordinary skill in the art. Arm 412 is of dimensions allowing it to be inserted into slots 206. Arm 412 may be configured to interact with guide mechanisms in slots 206. For example, two sides of arm 412 may each have a roller that allows removable filter holder 118 to be inserted into slots 206 along the guide mechanism (i.e., guide mechanism configured as a track and roller system). Arm 412 may be of a length that places a central point of filter setting 410, and thus a central point of removable filter 408, in line with the axis of camera lens body 202. Aligning arm 412 based on a central point, in line with the axis of camera lens body 202, provides an origin point by which all components of camera lens 108 can be aligned.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein. Any dimensions provided herein are exemplary and other dimensions are possible, as would be appreciated by a person of ordinary skill in the art.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. An apparatus, comprising:
   a camera lens body;
   an upper flange, wherein the upper flange has a bottom surface that is configured to partially contact the camera lens body;

a perimeter gasket coupled to the bottom surface of the upper flange; and a shaft coupled to the bottom surface of the upper flange and configured to extend along a guide mechanism into a slot in the camera lens body, the shaft comprising:
a removable filter;
a filter setting configured to hold the removable filter; and
an arm connecting the bottom surface of the upper flange to the filter setting.

2. The apparatus of claim 1, wherein the upper flange is coupled to the camera lens body by one or more fastening mechanisms.

3. The apparatus of claim 1, wherein the perimeter gasket is coupled to the upper flange in a recess slot along a perimeter of the bottom surface.

4. The apparatus of claim 1, wherein the perimeter gasket is a rubber gasket configured to seal the slot from outside debris when the upper flange is in contact with the camera lens body.

5. The apparatus of claim 1, wherein the filter setting comprises:
a table having a central opening;
a recess slot along a perimeter of the table; and
at least one fastening mechanism on the table, and
wherein the removable filter lies in the recess slot and is secured to the table by the at least one fastening mechanism.

6. The apparatus of claim 1, wherein the removable filter comprises a low pass filter, a birefringent crystal, an LC shutter, or a diffractive optics filter.

7. The apparatus of claim 1, wherein the removable filter is configured to be rotatable in the filter setting.

8. The apparatus of claim 1, wherein the guide mechanism comprises a plurality of guide tracks and a plurality of end caps, and
wherein the arm comprises a plurality of rollers that follow the plurality of guide tracks and stop at the plurality of end caps.

9. The apparatus of claim 1, wherein the arm is of a length that places a central point of the filter setting in line with an inner central point of the camera lens body.

10. A system, comprising:
a camera lens body elongated along an axis;
one or more camera lenses that are perpendicular to the axis, the one or more camera lenses being positioned within the camera lens body and along the axis;
one or more slots in the camera lens body that are perpendicular to the axis, the one or more slots creating one or more openings in the camera lens body among the one or more camera lenses;
one or more guide mechanisms positioned in the one or more slots; and one or more removable filter holders positioned in the one or more slots along the one or more guide mechanisms, each of the one or more removable filter holders comprising:
an upper flange, wherein the upper flange has a bottom surface that is configured to partially contact the camera lens body;
a perimeter gasket coupled to the bottom surface of the upper flange; and
a shaft coupled to the bottom surface of the upper flange, the shaft comprising:
a removable filter;
a filter setting configured to hold the removable filter; and
an arm connecting the bottom surface of the upper flange to the filter setting.

11. The system of claim 10, wherein the camera lens body is cylindrical, and
wherein the bottom surface of the upper flange comprises an arc surface having the same radius as the camera lens body.

12. The system of claim 10, wherein the upper flange is coupled to the camera lens body by one or more fastening mechanisms.

13. The system of claim 10, wherein the perimeter gasket is coupled to the upper flange in a recess slot along a perimeter of the bottom surface.

14. The system of claim 10, wherein the perimeter gasket is a rubber gasket configured to seal the one or more slots from outside debris when the upper flange is in contact with the camera lens body.

15. The system of claim 10, wherein the filter setting comprises:
a table having a central opening;
a recess slot along a perimeter of the table; and
at least one fastening mechanism on the table, and
wherein the removable filter lies in the recess slot and is secured to the table by the at least one fastening mechanism.

16. The system of claim 10, wherein the removable filter comprises a low pass filter, a birefringent crystal, an LC shutter, or a diffractive optics filter.

17. The system of claim 10, wherein the removable filter is configured to be rotatable in the filter setting.

18. The system of claim 10, wherein each of the one or more guide mechanisms comprises a plurality of guide tracks and a plurality of end caps, and
wherein the arm comprises a plurality of rollers that follow the plurality of guide tracks and stop at the plurality of end caps.

19. The system of claim 10, wherein the arm is of a length that places a central point of the filter setting in line with an inner central point of the camera lens body.

* * * * *